United States Patent
Masias et al.

(10) Patent No.: US 10,268,215 B2
(45) Date of Patent: Apr. 23, 2019

(54) FLUID REGULATORS AND ASSOCIATED ACTUATORS

(71) Applicant: TESCOM CORPORATION, Elk River, MN (US)

(72) Inventors: Justin L. Masias, McKinney, TX (US); Eric J. Burgett, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 425 days.

(21) Appl. No.: 14/993,904

(22) Filed: Jan. 12, 2016

(65) Prior Publication Data
US 2017/0199531 A1    Jul. 13, 2017

(51) Int. Cl.
| | |
|---|---|
| G01L 9/00 | (2006.01) |
| G05D 16/20 | (2006.01) |
| G05D 16/06 | (2006.01) |
| G05D 16/10 | (2006.01) |
| F16K 31/00 | (2006.01) |

(52) U.S. Cl.
CPC ......... *G05D 16/2093* (2013.01); *F16K 31/00* (2013.01); *G01L 9/0048* (2013.01); *G05D 16/06* (2013.01); *G05D 16/10* (2013.01)

(58) Field of Classification Search
CPC ....... G01L 13/025; G01L 7/00; G01L 9/0048; G01B 7/18; G01B 5/30; G05D 16/2093; G05D 16/06; G05D 16/10; F16K 31/00
See application file for complete search history.

(56) References Cited

U.S. PATENT DOCUMENTS

| | | | | |
|---|---|---|---|---|
| 2,940,468 A | * | 6/1960 | Drabik ............... | G05D 16/0672 137/461 |
| 3,043,332 A | * | 7/1962 | Henriques .......... | G05D 16/0672 137/116.5 |
| 3,561,904 A | * | 2/1971 | Katchka et al. ... | G05D 16/0672 137/14 |
| 4,813,447 A | * | 3/1989 | Ichiryu ............... | F15B 13/0405 137/486 |
| 5,186,208 A | * | 2/1993 | Hansen ............. | G05D 16/0602 137/315.05 |

(Continued)

OTHER PUBLICATIONS

International Search Report for PCT/US2017/013098, dated Apr. 11, 2017.
Written Opinion for PCT/US2017/013098, dated Apr. 11, 2017.

*Primary Examiner* — Harshad R Patel
*Assistant Examiner* — Nigel Plumb
(74) *Attorney, Agent, or Firm* — Marshall, Gerstein & Borun LLP

(57) ABSTRACT

A system for providing a force on a main valve member includes a first sensing element adapted to couple to a portion of the main valve member. A first loading element may be directly or indirectly coupled to the first sensing element such that the first loading element provides a first force on the first sensing element. The first loading element is adapted to transfer the first force to the first sensing element and the main valve member. The system also includes a second sensing element to the first sensing element. A second loading element is coupled to the second sensing element and the first sensing element. The second loading element is adapted to provide a second force on the second sensing element to transfer the second force to the main valve member.

20 Claims, 5 Drawing Sheets

(56) References Cited

U.S. PATENT DOCUMENTS

| | | | | |
|---|---|---|---|---|
| 5,391,209 A | * | 2/1995 | Pelkey | F17D 1/20 |
| | | | | 137/14 |
| 7,836,784 B2 | * | 11/2010 | Nogami | F16K 37/0083 |
| | | | | 73/865.9 |
| 8,474,301 B2 | * | 7/2013 | Al-Buaijan | F16K 37/0083 |
| | | | | 73/1.72 |
| 2006/0249206 A1 | * | 11/2006 | Trapp | G05D 16/10 |
| | | | | 137/505.22 |
| 2011/0297856 A1 | * | 12/2011 | Bill | F15B 13/0433 |
| | | | | 251/129.15 |

* cited by examiner

//<br>
FLUID REGULATORS AND ASSOCIATED ACTUATORS

FIELD OF THE DISCLOSURE

This disclosure relates generally to actuators for a valve or regulator, and, more specifically, a system for generating a force on a control member of the valve or regulator.

BACKGROUND

Typically, valves (such as control valves or pressure regulators) are opened and closed by a pneumatic actuator. For example, a control fluid under pressure is introduced into a housing of the actuator, and the control fluid acts on a diaphragm that is coupled to a valve member of the control valve. An increase in pressure in the housing of the actuator may cause the valve member to displace toward a valve seat of the control valve, thereby closing the control valve. A decrease in pressure in the housing of the actuator may cause the valve member to displace away from valve seat of the control valve, thereby opening the control valve.

Typically, springs and air pressure within the pneumatic actuator are used to generate the loading force of the control valve. In some applications, electronic pressure regulators may be used in conjunction with pneumatic actuators to, for example, adjust the set point of the control valve. The electronic pressure regulator may use a small, variable pneumatic signal to pressure load the actuator or an amplifier to multiply the force generated by the signal. Accordingly, a small pneumatic signal (typically 0-100 psig) to control a large pressure (0-10,000 psig). However, errors associated with the electronic pressure regulator, the pressure transmitter used for sensing the set point, and the accuracy of the tuning are all amplified as well, thereby resulting in large fluctuations of the set point.

BRIEF SUMMARY OF THE DISCLOSURE

A system for providing a force on a main valve member includes a first sensing element adapted to be directly or indirectly coupled to a portion of the main valve member. A first loading element may be directly or indirectly coupled to the first sensing element such that the first loading element provides a first force on the first sensing element. The first loading element is adapted to transfer the first force to the first sensing element and the main valve member. The system also includes a second sensing element directly or indirectly coupled to the first sensing element. A second loading is element directly or indirectly coupled to the second sensing element and the first sensing element. The second loading element is adapted to provide a second force on the second sensing element to displace the second sensing element and the first sensing element a second distance and transfer the second force to the main valve member.

A method of applying a total force on a main valve member of a main actuator or a main valve includes applying a first force on a first sensing element by a first loading element, the first sensing element being directly or indirectly coupled to the main valve member. The method also includes applying a second force on a second sensing element by a second loading element, the second sensing element being coupled to the first sensing element such that the second force is transferred to the first sensing element and the main valve member, wherein the first force and the second force combine for the total force on the main valve member.

DETAILED DESCRIPTION

Figure 1:
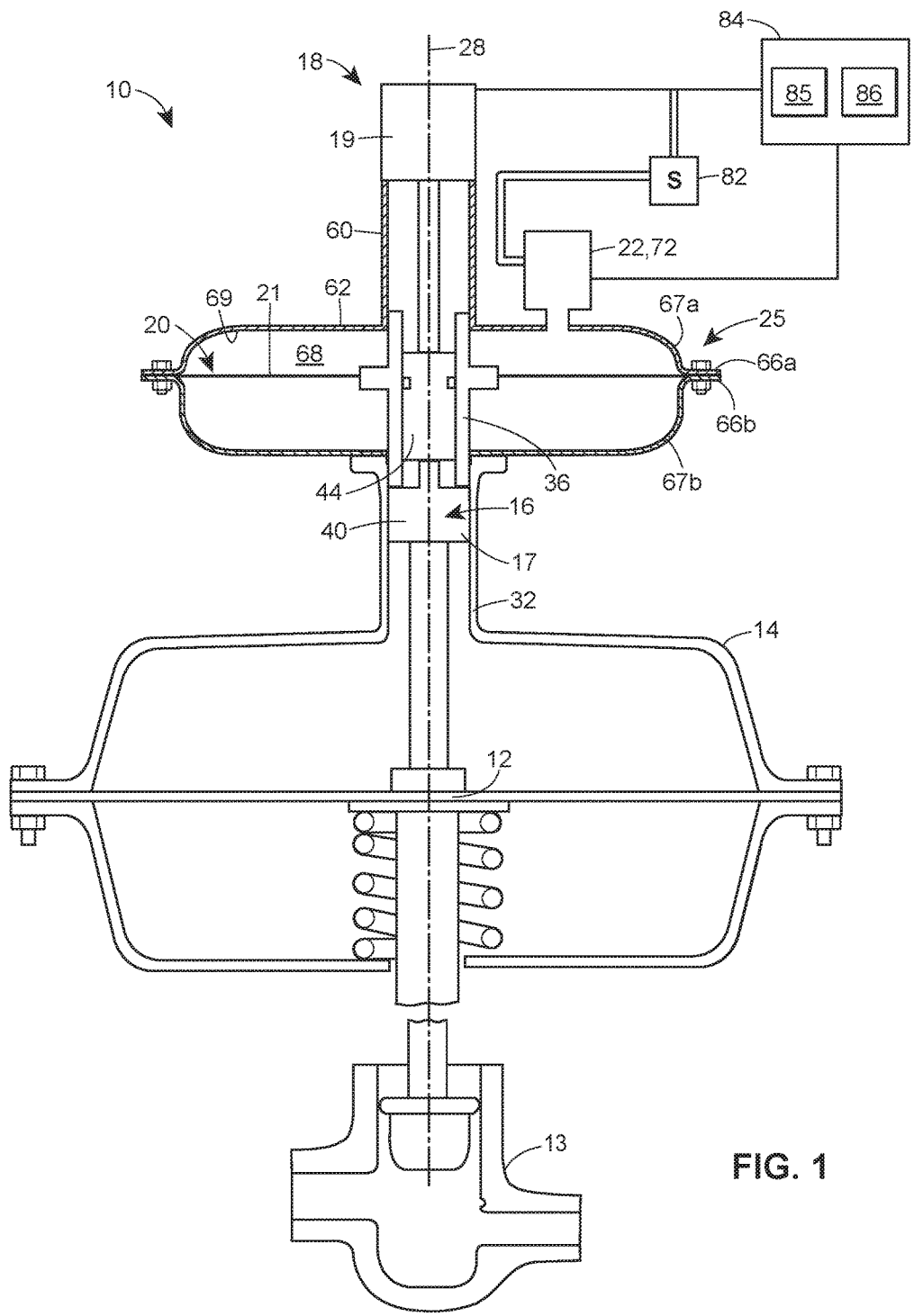
FIG. 1 is a schematic view of an embodiment of a system for providing a force on a main valve member of a main actuator or a control valve.

As illustrated in FIG. 1, a system 10 (i.e., a compound loading element) is disclosed for providing a force on a main valve member 12 of a main actuator 14 and/or of a control valve, which is indicated schematically at 13. The main valve member 12 may be any portion of a main actuator 14 that directly or indirectly actuates a closure member of the control valve 13, such as an actuator shaft of the main actuator. The main valve member 12 may also be a valve shaft coupled to the closure member of the control valve 13. The skilled person would recognize that the closure member of the control valve 13 may upwardly or downwardly displace relative to a valve seat to open and close the control valve 13 in a known manner.

Still referring to FIG. 1, the system 10 includes a first sensing element 16 (for example, a piston 17) adapted to be directly or indirectly coupled to a portion of the main valve member 12. A first loading element 18 (for example, an electronically adjustable spring 19) may be directly or indirectly coupled to the first sensing element 16 such that the first loading element 18 is adapted to provide (or provides) a first force on the first sensing element 16 (and may displace the first sensing element 16 a first distance), and the first force is transferred from the first sensing element 16 to the main valve member 12.

The system 10 may also include a pressure amplifier 25, which may include a second sensing element 20 (for example, a diaphragm 21) directly or indirectly coupled to the first sensing element 16. The pressure amplifier 25 may also include a second loading element 22 (for example, an electronic regulator 23) directly or indirectly coupled to the second sensing element 20 and the first sensing element 16. The second loading element 22 is adapted to provide (or provides) a second force on the second sensing element 20 (in addition to the first force provided by the first loading element 18 on the first sensing element 16) that is transferred to the first sensing element 16 and to the main valve member 12. The second loading element 22 may also displace the second sensing element 20 and the first sensing element 16 a second distance. The second force may be significantly less than the first force. For example, the second force may be between 0.05% and 10% of the first force.

So configured, two loading elements are combined to form the compound loading element to increase the accuracy of the force provided to the main valve member 12. Specifically, adjusting the first force provided by the first loading element 18 on the first sensing element 16 allows for a "coarse" (or large-scale) adjustment of the overall force provided to the main valve member 12. Adjusting the force provided by the second loading element 22 on the second sensing element 20 allows for fine-tuning the overall force (or small-scale force adjustment) transferred to the main valve member. Such large-scale and small-scale adjustments allow for improved accuracy adjustment at high system pressures as well as increasing the turndown ratio of the system as a whole. For example if a set point of 9000 psig is desired, the first loading element 18 (e.g., the electronically adjustable spring 19) could be used with a 1:1 pressure amplifier 25. The electronically adjustable spring 19 could be adjusted to 8,950 psig and the electronic regulator 23 would maintain the additional 50 psig. Accordingly, small fluctuations in the set point would be handled by second loading element 22 (the electronic regulator 23), and large set point fluctuations would be handled by the first loading element 18 (the electronically adjustable spring 19).

Figure 2:
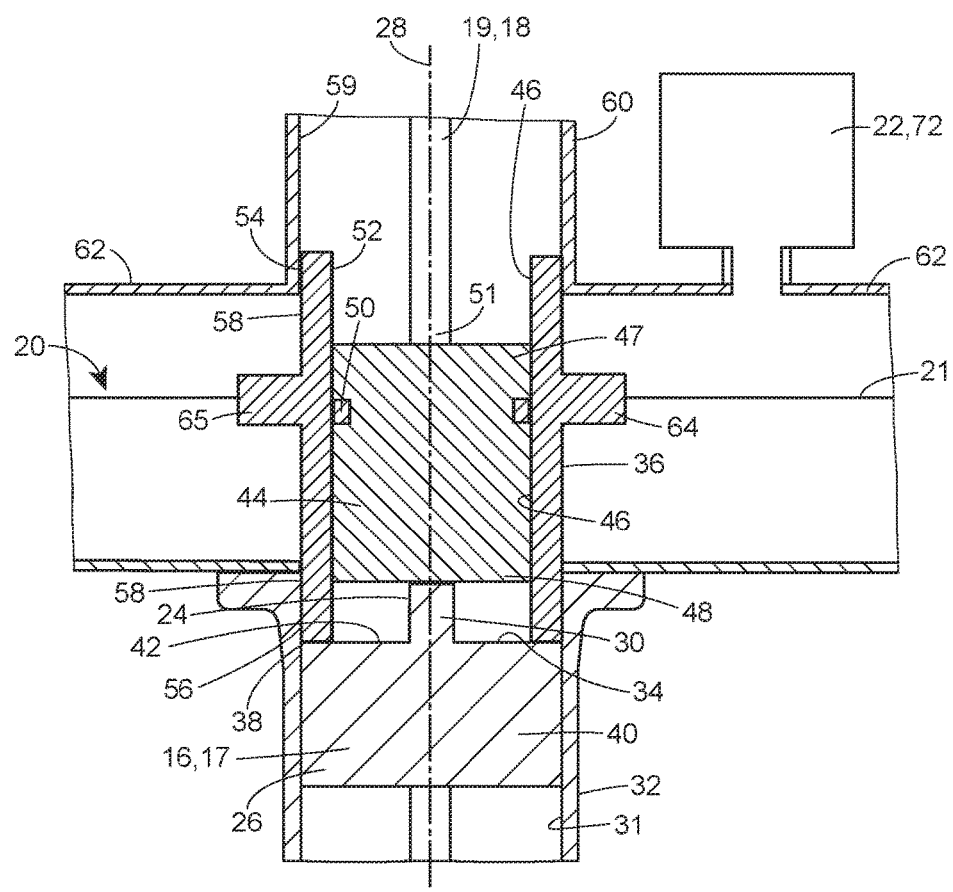
FIG. 2 is a detailed view of an embodiment of a collar, a piston, and a plunging member of the embodiment of FIG. 1.

Turning to the system 10 in more detail, the first sensing element 16 may have any suitable size or shape that allows the first loading element 18 to transfer a first force to the first sensing element 16 and, in some embodiments, translate the first sensing element 16 a first distance. For example, as illustrated in FIG. 2, the first sensing element 16 may be the piston 17, which may extend from a first end 24 to a second end 26 along a longitudinal axis that may be collinear with a longitudinal assembly axis 28. The piston 17 may have any suitable cross-sectional shape or combination of shapes when viewed along the longitudinal assembly axis 28, and the piston 17 may be slidably received in a corresponding bore 31 of a conduit portion 32 of a control valve 13 or main actuator 14. The bore 31 of the conduit portion 32 may have a cross-sectional shape that corresponds to the cross-sectional shape of the piston 17. For example, the piston 17 (or a portion of the piston) and the bore 31 of the conduit portion 32 may have a circular cross-sectional shape. More specifically, the piston 17 may have a first portion 30 that extends from the first end 24 to an intermediate point 38, and a second portion 40 that extends from the intermediate point 38 to the second end 26, and the second portion 40 may have a circular cross-sectional shape that corresponds to the cross-sectional shape of the bore 31 of the conduit portion 32. The piston 17 may also have an engagement surface 34 that may be adapted to engage a portion of a collar 36 in a manner that will be described in more detail. The engagement surface 34 may be a circumferential portion of a top surface 42 of the second portion 40. The first portion 30 may also have a circular cross-sectional shape, and a diameter of the first portion 30 may be less than a diameter of the second portion 40 to form a should that includes the engagement surface 34.

As illustrated in FIGS. 1 and 2, the system 10 may also include a plunging member 44, and at least a portion of the plunging member 44 may be disposed (e.g., slidably disposed) within a bore 46 of the collar 36. As illustrated in FIG. 2, the plunging member 44 may extend from a first end 47 to a second end 48 along a longitudinal axis that may be collinear with the longitudinal assembly axis 28. The plunging member 44 may have any suitably cross-sectional shape or combination of shapes when viewed along the longitudinal assembly axis 28, and the bore 46 may have a cross-sectional shape that corresponds to the cross-sectional shape of the plunging member 44. For example, the plunging member 44 and the bore 46 may have a circular cross-sectional shape, and a diameter of the plunging member 44 may be slightly less than (e.g., 2% to 10% less than) a diameter of the bore 46. A seal 50 may be disposed about a circumferential portion of the plunging member 44, and the seal 50 may sealingly and slidingly engage a collar bore surface 52 that extends along a longitudinal axis that may be collinear with the longitudinal assembly axis 28.

As seen in FIGS. 1 and 2, the system 10 may also include the collar 36 that may be coupled to at least one of the first sensing element 16 and the second sensing element 20. As illustrated in FIG. 2, the collar 36 may extend from a first end 54 to a second end 56 along a longitudinal axis that may be collinear with the longitudinal assembly axis 28. The bore 46 may extend along the longitudinal assembly axis 28 from the first end 54 to the second end 56. As previously explained, the cross-sectional shape of the bore 46 may correspond to the cross-sectional shape of the plunger 44. An outer surface 58 of the collar 36 may have any suitable cross-sectional shape or combination of shapes when viewed along the longitudinal assembly axis 28, and the bore 46 may have a cross-sectional shape that corresponds to the cross-sectional shape of the plunging member 44. For example, the plunging member 44 and the bore 46 may have a circular cross-sectional shape, and a diameter of the plunging member 44 may be slightly less than (e.g., 2% to 10% less than) a diameter of the bore 46. The outer surface 58 of the collar 36 may also have a cross-sectional shape that corresponds to the cross-sectional shape of the bore 31 of the conduit portion 32. For example, the outer surface 58 may have a circular cross-sectional shape, and a diameter of the outer surface 58 may be slightly less than (e.g., 2% to 10% less than) a diameter of the bore 31 of the conduit portion 32 to allow a portion of the second end 56 of the collar 36 to be slidably received in the bore 31 of the conduit portion 32. The diameter of the outer surface 58 may also be slightly less than (e.g., 2% to 10% less than) a diameter of an inner surface 59 of an extension portion 60 of an actuator housing 62 to allow a portion of the first end 54 of the collar 36 to be slidably received in the extension portion 60 of the actuator housing 62.

The collar 36 may translate from a first position to a second position along the longitudinal assembly axis 28 by pressure applied to the second sensing element 20. A portion of the collar 36 may be adapted to engage a portion of the piston 17 displace the piston 17 and/or apply a force to the piston 17. For example, the second end 56 of the collar 36 may be adapted to engage the engagement surface 34 of the piston 17 to displace the piston 17 (e.g., downwardly displace the piston 17) along the longitudinal assembly axis 28 and/or to apply a force to the piston 17. The collar 36 may also have a mating portion 64 that is adapted to secure a portion of the second sensing element 20 to the collar 36. For example, the mating portion 64 may be a circumferential projection 65 extending radially outward of the outer surface 58 of the collar 36, and the projection 65 may have a gap that receives an inner circumferential portion of the diaphragm 21 to secure the diaphragm to the collar 36. The projection 65 may be disposed between the first end 54 and the second end 56 of the collar 36. In some embodiments of the collar 36, such as that illustrated in FIGS. 4 and 5, the projection 65 may be disposed at or adjacent to the first end 54 of the collar 36.

Referring to FIGS. 1 and 2, the system 10 may also include the first loading element 18 that is directly or indirectly coupled to the first sensing element 16 such that the first loading element 18 provides a force (e.g., the first force) on the first sensing element 16 and may also displace the first sensing element 16 the first distance. For example, the first loading element 18 may be an adjustable spring 19. The adjustable spring 19 may be any suitable mechanism (e.g., an electronically adjustable spring or motorized actuator) that is capable of providing a desired force on the first sensing element 16, such as the TESCOM™ 70-2000 Series Motorized Actuator. The adjustable spring 19 may have a first portion that is mounted to the extension portion 60 of the actuator housing 62, and a second portion may extend thorough the extension portion 60. As illustrated in FIG. 2, an end portion 51 of the adjustable spring 19 may be coupled to the first end 47 of the plunging member 44 such that a force generated by the adjustable spring 19 is transferred to the plunging member 44 and to the piston 17 that contacts the plunging member 44. In some embodiments, the adjustable spring 19 may be in communication with a source of pressurized fluid 82 via a pneumatic line 83, as illustrated in FIG. 1.

The first loading element 18 (e.g., the adjustable spring 19) may also be in communication with a computer 84 having a microprocessor 85 and a memory 86 that may be located remote from the first loading element 18. The connection may be wireless or may be a wired connection, as illustrated in FIG. 1. A user may issue commands via the computer 84 to the first loading element 18 and/or the computer 84 may automatically issue commands to the to the first loading element 18 based on system feedback.

The system 10 may also include the pressure amplifier 25, which may include the second sensing element 20 directly or indirectly coupled to the first sensing element 16. As illustrated in FIG. 1, the second sensing element 20 may be the diaphragm 21, and the diaphragm 21 may be disposed within the actuator housing 62. As previously explained, and as illustrated in FIG. 1, the inner circumferential portion of the diaphragm 21 may be secured the mating portion 64 of the collar 36. Referring to FIG. 1, an outer circumferential portion of the diaphragm 21 may be secured between a bottom portion 66a of a first actuator housing portion 67a and a top portion 66b of a second actuator housing portion 67b. The first actuator housing portion 67a may be secured to the second actuator housing portion 67b to form the actuator housing 62. An actuator volume 68 may be at least partially defined by an inner surface 69 of the first actuator housing portion 67a and a top surface 70 of the diaphragm 21.

Figure 3:
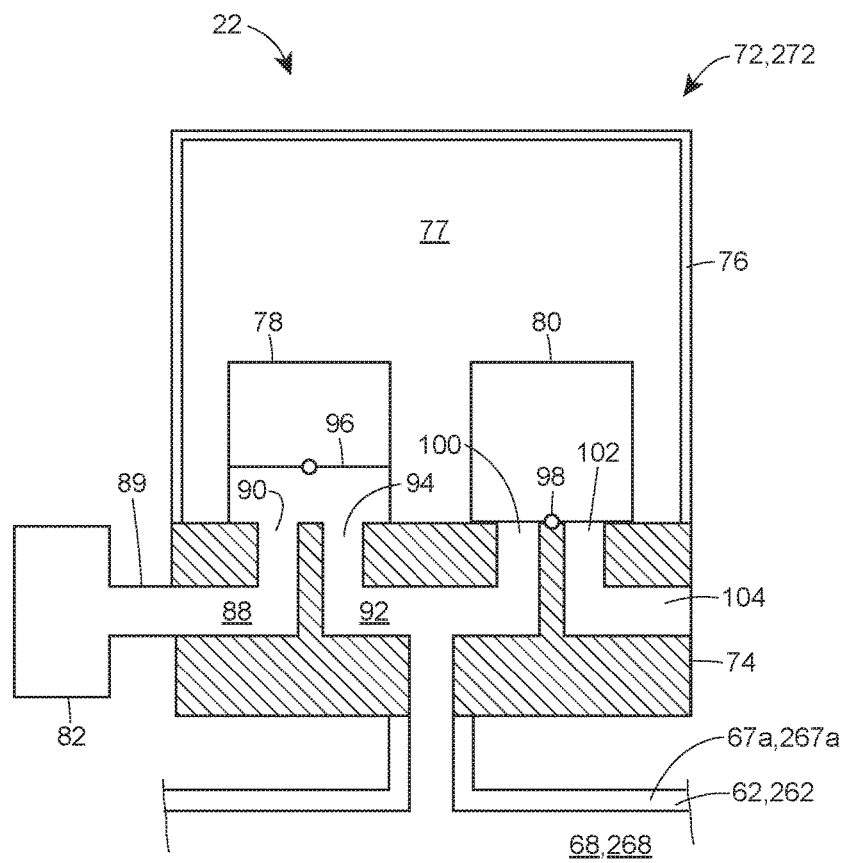
FIG. 3 is a schematic view of an embodiment of a second loading element.

Referring to FIGS. 1 and 2, the system 10 (and the pressure amplifier 25) may also include the second loading element 22 that is directly or indirectly coupled to the second sensing element 20 and the first sensing element 16. The second loading element 22 may be any suitable mechanism capable of providing a force (e.g., a second force) on the second sensing element 20 (and the first sensing element 16) and displacing the second sensing element 20 (and the first sensing element 16) a second distance (e.g., relative to the actuator housing 62). For example, as illustrated in FIG. 3, the second loading element 22 may be an electronic actuator 72 (such as a TESCOM™ ER5000 Series Electropneumatic Controller), and the electronic actuator 72 may include a base portion 74, a cap portion 76, a first solenoid valve 78, and a second solenoid valve 80. The cap portion 76 may be coupled to the base portion 73, and the first and second solenoid valves 78, 80 may be secured to the base portion 74 and be disposed in an interior portion 77 of the cap portion 76. An inlet passageway 88 may be formed in the base portion 74, and a first end of the inlet passageway 88 may be connected to a pneumatic line 89 that is connected to a source (e.g., the source 82) of pressurized fluid and the second end may be in communication with an inlet 90 of the first solenoid valve 78. An intermediate passageway 92 may be formed in the base portion 74, and a first end of the intermediate passageway 92 may be in communication with an outlet 94 of the first solenoid valve 78 and a second end of the intermediate passageway 92 may be in communication with the actuator volume 68 of the actuator housing 62.

When a closure member 96 is in an open position (as illustrated in FIG. 3), fluid from the source 82 flows through the pneumatic line 89, through the inlet passageway 88, thought the inlet 90 and outlet 94 of the first solenoid valve 78, through the intermediate passageway 92, and into the actuator volume 68. When the closure member 96 is in a closed position (i.e., the position of the closure member 89 of the second solenoid valve 80 illustrated in FIG. 3), fluid from the source 82 is prevented from flowing into the actuator volume 68. The second solenoid valve 80 may be identical to the first solenoid valve 72, and when a closure member 98 is in a closed position (as illustrated in FIG. 3), fluid from the actuator volume 68 is prevented from being vented to the atmosphere. When the closure member 98 is in an open position (i.e., the position of the closure member 96 illustrated in FIG. 3), fluid from the actuator volume 68 flows through the through the intermediate passageway 92, through an inlet 100 and outlet 102 of the second solenoid valve 80, and through an outlet passageway 104 to vent to the atmosphere. When venting to the atmosphere, the closure member 96 of first solenoid valve 78 may be in a closed position.

In use, signals from the computer 84 may cause the first loading element 18 (e.g., the adjustable spring 19) to provide a desired first force on the plunging member 44, which in turn transfers the first force to the first sensing element 16 (e.g., the piston 17). Such a first force may displace (e.g., downwardly displace in a direction towards the main actuator 14) the piston 17 a first distance along the longitudinal assembly axis 28 relative to a portion of the actuator housing 62 (e.g., a top portion of the extension portion 60 of the actuator housing 62) or relative to a portion of the main actuator 14 or control valve 13. The first force is a "coarse" force that provides the majority of the force required by the system 10, and this coarse force will be fine-tuned by the second loading element to provide an accurate total force by the system, as previously described.

To fine-tune the total force transmitted by the first sensing element 16, the second loading element 22 (e.g., the electronic regulator 23) may provide a second force to the second sensing element 20 (e.g., the diaphragm 21) that may be applied in addition to the first force (and at the same times as the first force). For example, signals from the computer 84 (communicated wirelessly or by a wired connection) may cause the electronic regulator 23 to adjust pressure in the actuator volume 68 of the actuator housing 62, and the force associated with this pressure (i.e., the second force) is transferred by the collar 36 directly to the piston 17. For example, the electronic regulator 23 may increase pressure in the actuator volume 68 of the actuator housing 62, and the second end of the 56 of the collar 36 may engage the engagement surface 34 of the piston 17 to transfer the second force to the piston 17 and displace the piston 17 the second distance (in addition to or on top of the first distance) along the longitudinal assembly axis 28 relative to a portion of the actuator housing 62 (e.g., a top portion of the extension portion 60 of the actuator housing 62) or relative to a portion of the main actuator 14 or control valve (not shown). Because the force on the plunging member 44 is provided by the adjustable spring 19, the plunging member 44 downwardly displaces—and remains engaged with—the piston 17 while the collar 36 applies the second force to the piston 17 (and may downwardly displace along with the piston 17). The piston 17 may then impart the combined load of the first force and the second force to a portion of a control valve (e.g., a main valve member 12 that selectively engages and disengages a valve seat of the control valve to open and close the control valve) or the main actuator 14 that displaces the main valve member 12 of the control valve. In some embodiments, the system 10 may replace a spring or a spring assembly used in the main actuator 14.

The person having ordinary skill in the art would recognize that the first sensing element 16 and first loading element 18 and/or the second sensing element 20 and the second loading element 22 may include any mechanism or assembly capable of providing a coarse and fine-tuned force to the main valve member 12. For example, rare earth magnets, weights, electromagnets, and/or hydraulics may be used to provide either or both of the coarse fore or finetuning force on the main valve member 12. The person having ordinary skill in the art would recognize that, in addition to the first sensing element 16 and first loading element 18 and the second sensing element 20 and the second loading element 22, a third sensing element (not shown) and a third loading element (not shown) may also be sued to increase system accuracy. Additional sensing elements and loading elements are also contemplated.

Figure 4:
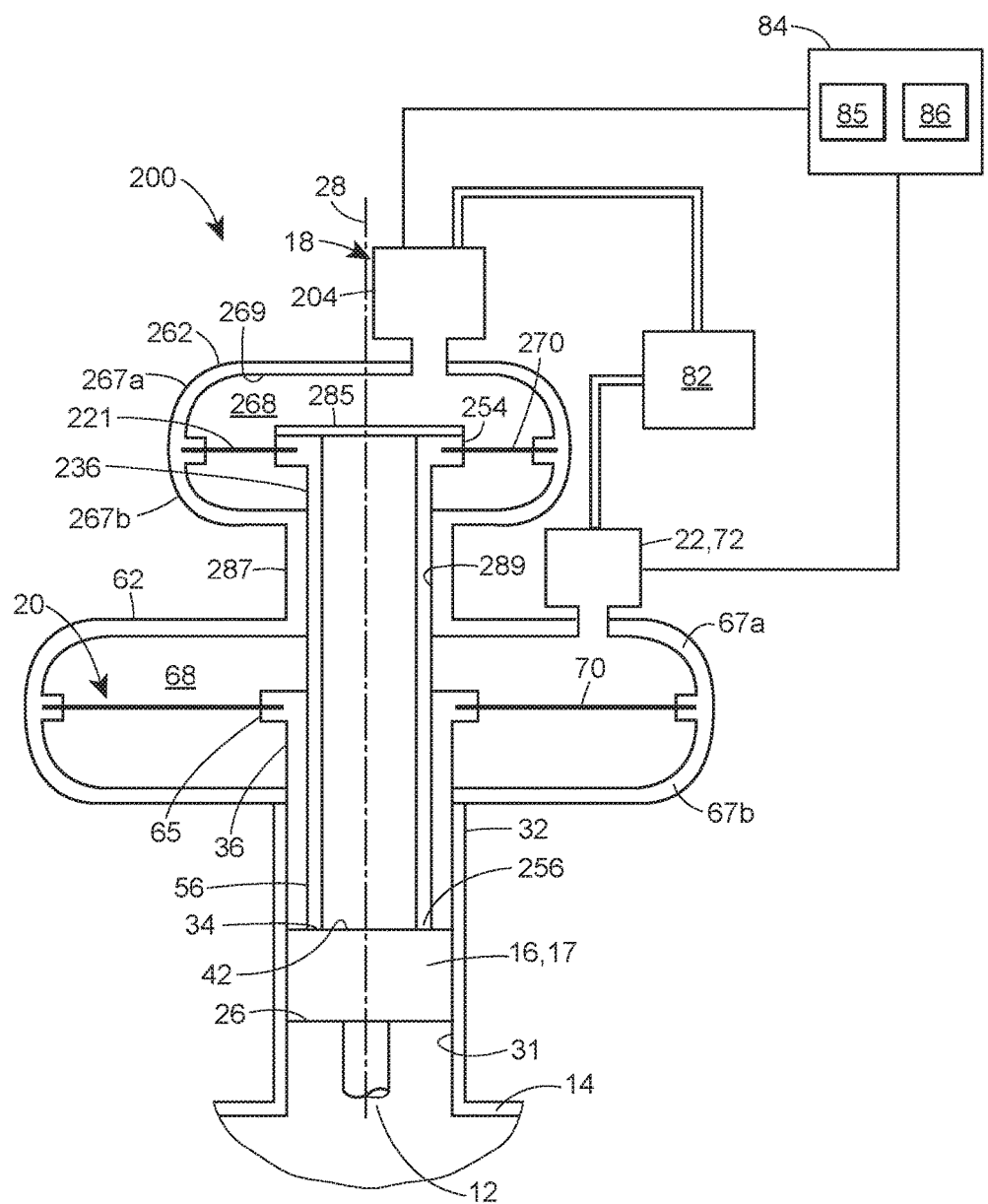
FIG. 4 is a schematic view of another embodiment of a system for providing a force on a main valve member of a main actuator or a control valve.
Figure 5:
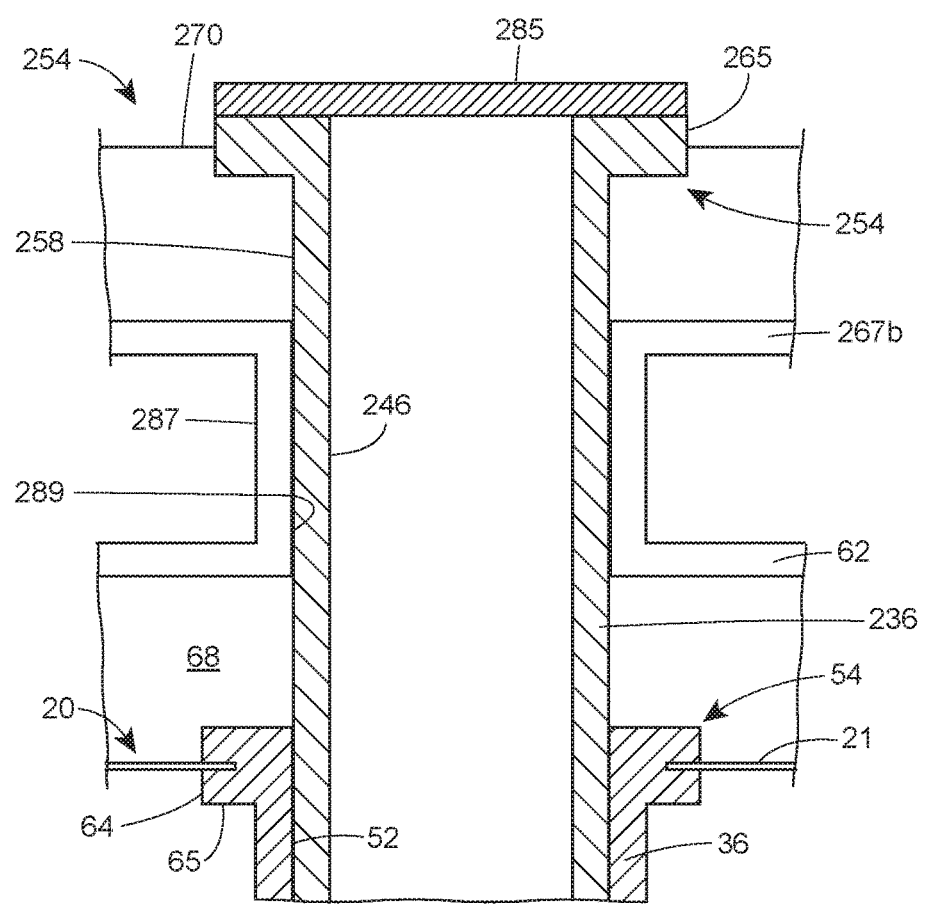
FIG. 5 is a detailed view of the embodiment of FIG. 4.

A further embodiment of system 200 for providing a force on a main valve member 12 is illustrated in FIG. 4. The system 200 is similar to the system 10 illustrated in FIG. 1 in several respects, and like elements will have like reference numbers. However, instead of the first loading element 18 being an electronically adjustable spring 19, the first loading element 18 may be identical in function to the second loading element 22, which may be an electronic actuator 272 that may be identical to the electronic actuator 72 previously described and illustrated in FIG. 3. The electronic actuator 272 may be adapted to provide a pressure on a secondary diaphragm 221 disposed within a secondary actuator housing 262. The secondary diaphragm 221 may have a smaller outer diameter than that of the diaphragm 21 of the actuator housing 62, and this smaller diameter is adapted to provide a smaller force than that provided by the diaphragm 21. For example, the secondary diaphragm 221 may have an outer diameter that is 90% to 25% of the outer diameter of the diaphragm 21. As illustrated in FIG. 5, an inner circumferential portion of the secondary diaphragm 221 may be secured to a projection 265 of a secondary collar 236 that may be similar to the collar 36 previously described. The secondary collar 236 may extend from a first end 254 to a second end 256 along a longitudinal axis that may be collinear with the longitudinal assembly axis 28. A secondary bore 246 may extend along the longitudinal assembly axis 28 from the first end 254 to the second end 256. The projection 265 of the secondary collar 236 may be disposed at or adjacent to the first end 254 of the secondary collar 236. A top portion 285 may be secured to the first end 254, and the seal (not shown) may be disposed between the top portion 285 and the first end 254 of the secondary collar 236 to prevent fluid from traveling between the top portion 285 and the first end 254.

A portion of the secondary collar 236 may be slidably received within the bore 46 of the collar 36, and an outer surface 258 of the secondary collar 236 may correspond in shape to the collar bore surface 52 of the collar 36. For example, the outer surface 258 of the secondary collar 236 and the collar bore surface 52 of the collar 36 may both be cylindrical, and a diameter of the outer surface 258 of the secondary collar 236 may be slightly smaller (e.g., 3% to 15% smaller) than a diameter of the collar bore surface 52 of the collar 36.

As illustrated in FIG. 4, an outer circumferential portion of the secondary diaphragm 221 may be secured between a bottom portion of a first actuator housing portion 267a and a top portion of a second actuator housing portion 267b. The first actuator housing portion 267a may be secured to the second actuator housing portion 267b to form the secondary actuator housing 262. A secondary actuator volume 268 may be at least partially defined by an inner surface 269 of the first actuator housing portion 67a and a top surface 270 of the secondary diaphragm 221. A passage portion 287 may connect the first actuator housing portion 67a of the actuator housing 62 to the second actuator housing portion 267b of the secondary actuator housing 262, and an inner surface 289 of the passage portion 287 may correspond in shape to the outer surface 258 of the secondary collar 236. For example, the outer surface 258 of the secondary collar 236 and the inner surface 289 of the passage portion 287 may both be cylindrical, and a diameter of the outer surface 258 of the secondary collar 236 may be slightly smaller (e.g., 3% to 15% smaller) than a diameter of the inner surface 289 of the passage portion 287. A portion of the secondary collar 236 may be slidably received in the passage portion 287 such that the secondary collar 236 displaces relative to the passage portion 287. A seal (not shown) may be disposed between the passage portion 287 and secondary collar 236 to prevent fluid within the actuator volume 68 from escaping between the gap between the inner surface 289 of the passage portion 287 and the outer surface 258 of the secondary collar 236.

As illustrated in FIG. 4, an embodiment of the piston 17 may be slidably disposed within the conduit portion 32, and the second end 56 of the collar 36 and the second end 256 of the secondary collar 236 may both also be disposed within the conduit portion 32 and may both be disposed in contact with or adjacent to the top surface 42 of the piston 17.

In use, the source 82 of fluid (or any other source of pressurized fluid) may be in communication with the inlet passageway 88 of the electronic actuator 272, and when the first solenoid valve 78 of the electronic actuator 272 is in an open position, fluid flows into the actuator volume 268 of the secondary actuator housing 262 and applies a desired force on the secondary diaphragm 221. Such a force downwardly displaces the secondary collar 236 in a manner identical to how the collar 36 is downwardly displaced by the diaphragm 21 described previously. The second end 256 of the secondary collar 236 may act on the top surface 42 of the piston 17 to displace the piston 17 a first distance along the longitudinal assembly axis 28 relative to a portion of the actuator housing 62 or relative to a portion of the main actuator 14 or control valve (not shown). The first force is a "coarse" force that provides the majority of the force required by the system 20, and this coarse force will be fine-tuned by the second loading element 22 to provide an accurate total force by the system.

To fine-tune the total force transmitted by the piston 17, the second loading element 22 (e.g., the electronic regulator 23) may provide a second force to the second sensing element 20 (e.g., the diaphragm 21) that may be applied in addition to the first force. For example, signals from the computer 84 may cause the electronic regulator 23 to adjust pressure in the actuator volume 68 of the actuator housing 62, and the force associated with this pressure (i.e., the second force) is transferred by the collar 36 directly to the piston 17. For example, the electronic regulator 23 may increase pressure in the actuator volume 68 of the actuator housing 62, and the second end of the 56 of the collar 36 may engage the engagement surface 34 of top surface 42 of the piston 17 to transfer the second force to the piston 17 and displace the piston 17 a second distance (in addition to or on top of the first distance) along the longitudinal assembly axis 28 relative to a portion of the actuator housing 62 or relative to a portion of the main actuator 14 or control valve (not shown). Pressure in the actuator volume 268 maintains the second end 256 of the secondary collar 236 in engagement with the top surface 42 of the piston 17 during this displacement. The piston 17 may then impart the combined load of the first force and the second force to a portion of a control valve (e.g., a main valve member 12 that selectively engages and disengages a valve seat of the control valve to open and close the control valve) or the main actuator 14 that displaces the main valve member 12 of the control valve. In some embodiments, the system 10 may replace a spring or a spring assembly used in the main actuator 14.

Additional compound elements may be added to the system 200 to further increase accuracy. For example, the first loading element 18 may be the electronic actuator 272 that may provide a pressure on a secondary diaphragm 221 disposed within a secondary actuator housing 262. However, a third electronic actuator (now shown) may provide pressure to a third diaphragm (not shown) in a third actuator housing (not shown) to provide a third force on a third collar (not shown) coupled to the first sensing element 16.

The third diaphragm may have a smaller outer diameter than that of the secondary diaphragm 221, and this smaller diameter is adapted to provide a smaller force than that provided by the secondary diaphragm 221. For example, the third diaphragm 221 may have an outer diameter that is 90% to 25% of the outer diameter of the secondary diaphragm 221. A third collar (not shown) may be disposed within a collar bore of the secondary collar 236, and displacement of the third collar may provide a third force on the piston 17 (in addition to the first and second forces provide by the collar 36 and the secondary collar 236.

While various embodiments have been described above, this disclosure is not intended to be limited thereto. Variations can be made to the disclosed embodiments that are still within the scope of the appended claims.

What is claimed is:

1. An apparatus, comprising:
   an actuator body including a first chamber and a second chamber;
   a first sensing element disposed in the first chamber and responsive to a first force to cause a first elongated body coupled to the first sensing element to apply a second force to an actuator stem; and
   a second sensing element disposed in the second chamber and responsive to a third force to cause a second elongated body to apply a fourth force to the actuator stem, the first elongated body slidably engaging the second elongated body to enable the first elongated body to apply the second force to the actuator stem and to enable the second elongated body to apply the fourth force to the actuator stem.

2. The apparatus of claim 1, wherein the first elongated body includes a flange and the first sensing element includes a diaphragm coupled to the flange, the diaphragm to move the first elongated body in response to the first force to enable the first elongated body to apply the second force to the actuator stem.

3. The apparatus of claim 1, wherein a pressure regulator is to be coupled to the second chamber to control a flow of fluid into the second chamber, a pressure of the fluid causing the third force.

4. The apparatus of claim 1, wherein the first sensing element is a stem and the first elongated body is a piston that sealingly engages the second elongated body, the second elongated body to sealingly engage the actuator body between the first chamber and the second chamber to deter the third force from affecting the piston.

5. The apparatus of claim 1, wherein the first elongated body is to sealingly engage the actuator body between the first chamber and the second chamber to prevent fluid from flowing between the first and second chambers.

6. The apparatus of claim 1, wherein the first elongated body includes a plunger and the second elongated body includes a collar, the plunger disposed within a collar bore of the collar, the plunger being displaceable to enable the plunger to apply the second force to the actuator stem.

7. The apparatus of claim 6, further including a seal disposed around a circumference of the plunger to sealingly and slidingly engage a surface defining the collar bore.

8. The apparatus of claim 1, wherein an electronically adjustable spring is to be coupled to the first elongated body via the first sensing element.

9. The apparatus of claim 1, wherein the second force is to be different than the fourth force.

10. The apparatus of claim 1, further including a pressure regulator to control a pressure causing the third force, the actuator body including a third chamber, a third sensing element being disposed in the third chamber and coupled to the actuator stem to enable the third sensing element to be responsive to the second force and the fourth force, the third sensing element to be coupled to a valve stem to enable movement of the third sensing element to control fluid flow through a valve.

11. The apparatus of claim 10, wherein the second sensing element is a first diaphragm and the third sensing element is a second diaphragm.

12. The apparatus of claim 11, wherein the first sensing element includes a stem to couple the first elongated body to a spring, the first elongated body includes a plunger coupled to the stem, the plunger is slidably received within a bore of a collar of the second elongated body, the collar being coupled to at least one of the second sensing element and to the first sensing element.

13. The apparatus of claim 1, wherein the first elongated is structured to be movable to enable the first elongated body to apply the second force to the actuator stem, the second elongated body is structured to be movable to enable the second elongated body to apply the fourth force to the actuator stem.

14. An actuator, comprising:
    an actuator body including a chamber across which a diaphragm extends, the diaphragm being coupled to a collar and responsive to a pressure to cause the collar to apply a first force to an actuator stem; and
    an elongated body extending through and sealingly engaging the collar, the elongated body being responsive to a second force to apply a third force to the actuator stem, the collar being movable to enable the collar to apply the first force to the actuator stem, the elongated body being movable to enable the elongated body to apply the third force to the actuator stem.

15. The actuator of claim 14, wherein the diaphragm is a first diaphragm, the chamber is a first chamber, and the actuator stem is a first actuator stem, the actuator body includes a second chamber across which a second diaphragm extends, the first actuator stem to apply a fourth force to at least one of the second diaphragm or a second actuator stem, the second actuator stem to be coupled to a valve shaft to control fluid flow through a valve.

16. The actuator of claim 15, wherein the collar is a first collar and the elongated body includes a second collar, the actuator body includes a third chamber across which a third diaphragm extends, the second collar coupled to the third diaphragm to enable the third diaphragm to move the second collar in response to the second force to enable the second collar to apply the third force to the actuator stem.

17. The actuator of claim 16, wherein the pressure is a first pressure, further including a first regulator to control the first pressure causing the first force and a second regulator to control a second pressure causing the third force.

18. The actuator of claim 15, further including a spring to apply the second force.

19. The actuator of claim 18, further including a spring load adjuster to control the second force.

20. The actuator of claim 14, wherein the elongated body is a first elongated body, further including a second elongated body having a projection, the projection to extend into the collar to enable the elongated body to engage the projection and to enable the third force to be applied to the actuator stem, the collar to surround the projection and to engage the second elongated body to enable the first force to be applied to the actuator stem.

* * * * *

UNITED STATES PATENT AND TRADEMARK OFFICE
CERTIFICATE OF CORRECTION

Page 1 of 1

PATENT NO. : 10,268,215 B2
APPLICATION NO. : 14/993904
DATED : April 23, 2019
INVENTOR(S) : Justin L. Masias et al.

It is certified that error appears in the above-identified patent and that said Letters Patent is hereby corrected as shown below:

In the Specification

At Column 6, Line 11, "closure member 89" should be -- closure member 98 --.

At Column 6, Line 15, "solenoid valve 72," should be -- solenoid valve 78, --.

At Column 8, Line 55, "system 20," should be -- system 200, --.

At Column 9, Line 2, "end of the 56" should be -- end 56 --.

In the Claims

At Column 10, Line 47, "elongated" should be -- elongated body --.

Signed and Sealed this
Third Day of November, 2020

Andrei Iancu
*Director of the United States Patent and Trademark Office*